United States Patent
Tagishi

(10) Patent No.: US 6,172,539 B1
(45) Date of Patent: Jan. 9, 2001

(54) SYNCHRONOUS BUFFER CIRCUIT AND DATA TRANSMISSION CIRCUIT HAVING THE SYNCHRONOUS BUFFER CIRCUIT

(75) Inventor: Mitsuaki Tagishi, Tokyo (JP)

(73) Assignee: NEC Corporation (JP)

( * ) Notice: Under 35 U.S.C. 154(b), the term of this patent shall be extended for 0 days.

(21) Appl. No.: 09/322,216

(22) Filed: May 28, 1999

(30) Foreign Application Priority Data

May 28, 1998 (JP) .................................................. 10-146967

(51) Int. Cl.[7] ....................................................... H03L 7/00
(52) U.S. Cl. ............................ 327/141; 327/212; 327/214
(58) Field of Search ..................................... 327/135, 141, 327/199, 208, 210, 211, 212, 214; 326/56, 57, 58, 82, 83

(56) References Cited

U.S. PATENT DOCUMENTS

| | | | |
|---|---|---|---|
| 4,775,840 | * 10/1988 | Ohmori et al. .......................... 327/34 |
| 4,879,693 | * 11/1989 | Ferrant .................................... 326/58 |
| 5,001,374 | * 3/1991 | Chang .................................... 327/141 |
| 5,172,397 | * 12/1992 | Llewellyn ............................. 375/110 |
| 5,179,295 | * 1/1993 | Mattison et al. ...................... 307/298 |
| 5,729,152 | * 3/1998 | Leung et al. ............................ 326/21 |
| 5,936,429 | * 8/1999 | Tomita .................................... 326/82 |

\* cited by examiner

Primary Examiner—Kenneth B. Wells
Assistant Examiner—Paul Dinh
(74) Attorney, Agent, or Firm—Hayes, Soloway, Hennessey, Grossman & Hage

(57) ABSTRACT

A first latch circuit latches output data in response to a leading edge of a clock signal. A second latch circuit latches the output data in response to a trailing edge of the clock signal. When the first latch circuit latches a low level, an n-channel MOS transistor is turned to an on-state in order to supply the transmission path to the low level. When the first latch circuit latches a high level, a p-channel MOS transistor is turned to an on-state during a period during which the second latch circuit latches the low level. The transmission path is supplied to thq high level.

6 Claims, 6 Drawing Sheets

| DATA | CLK | OUT |
|---|---|---|
| 0 | ↑ | 0 |
| 0 | ↓ | Hold |
| 1 | ↑ | 1 |
| 1 | ↓ | Hz1 |

FIG. 3

SYNCHRONOUS BUFFER CIRCUIT AND DATA TRANSMISSION CIRCUIT HAVING THE SYNCHRONOUS BUFFER CIRCUIT

BACKGROUND OF THE INVENTION

This invention relates to a synchronous buffer circuit and a data transmission circuit using the synchronous buffer circuit. More particularly, this invention is concerned with a synchronous bidirectional buffer circuit used to transfer data from or to a transmission line terminated by terminating resistors, and a data transmission circuit including the synchronous bidirectional buffer circuits.

In general, a low-amplitude level is often used as a fashion for transmitting data at a high speed over a transmission line. Since the adoption of a low amplitude enables minimization of reflection of a signal, fast transmission can be achieved. It is known that a conventional data transmission circuit is known as an exemplary data transmission circuit using a low-amplitude level.

Reflection of data occurs at terminals of a transmission line in the conventional data transmission circuit, as will be described later. It is therefore essential to absorb the reflection fully.

However, it is in practice very difficult to fully absorb reflection in the conventional data transmission circuit.

In order to reduce the reflection, a time instant at which an output level changes from a low level to a high level has been delayed on purpose in an effort to minimize reflection. An output waveform may be trimmed with respect to a slew rate in order to absorb a reflected wave. This method cannot help inviting a decrease in a data transmission rate.

SUMMARY OF THE INVENTION

It is an object of this invention to provide a synchronous buffer circuit capable of transmitting data at a high speed with absorbing a reflected wave fully It is another object of this invention to provide a data transmission circuit using the synchronous buffer circuit.

Other objects of this invention will become clear as the description proceeds.

According to a first aspect of this invention, there is provided a synchronous buffer circuit for outputting a buffered signal as an output signal to an output terminal in synchronous with a clock signal. The synchronous buffer circuit comprises a first latch circuit for latching the buffered signal as a first latched signal in response to first one of leading and trailing edges of the clock signal, a second latch circuit for latching the buffered signal as a second latched signal in response to second one of the leading and the trailing edges of the clock signal, and a producing circuit for producing the output signal in accordance with the first and the second latched signal.

According to a second aspect of this invention, there is provided a synchronous buffer circuit for outputting a buffered signal as an output signal to an output terminal in synchronous with a clock signal. The clock signal has first and second edges. The first edge is one of leading and trailing edge. The second edge is another one of the leading and the trailing edge. The synchronous buffer circuit comprises a latch circuit for latching the buffered signal as a latched signal in response to the first edge and producing means for producing a first one of high and low levels as the output signal until a next first edge is supplied, when the latched signal has a first logic level, the producing means producing a second one of the high and said low levels until the second edge is supplied, when the latched signal has a second logic level.

According to a third aspect of this invention, there is provided a data transmission circuit comprising a transmission path and a plurality of synchronous buffer circuits. A terminating voltage is applied to the transmission path through a terminating resistor. Each of the synchronous buffer circuits is electrically coupled to the transmission path. Each of the synchronous buffer circuits comprises first means for supplying the transmission path with a first voltage substantially equal to the terminating voltage, in synchronous with a clock signal, second means for supplying the transmission path with a second voltage substantially different from the terminating voltage, in synchronous with the clock signal, and third means for controlling the second means to make the second means supply the transmission path with the second voltage over a predetermined period during which the second voltage is synchronous with the clock signal, when an own synchronous buffer circuit transfers one of first and second logic levels to another synchronous buffer circuit in the predetermined period.

BRIEF DESCRIPTION OF THE DRAWINGS

FIG. 3 is a truth table for used in describing operation of the output buffer circuit illustrated in FIG. 2;

DESCRIPTION OF THE PREFERRED EMBODIMENT

Figure 1:
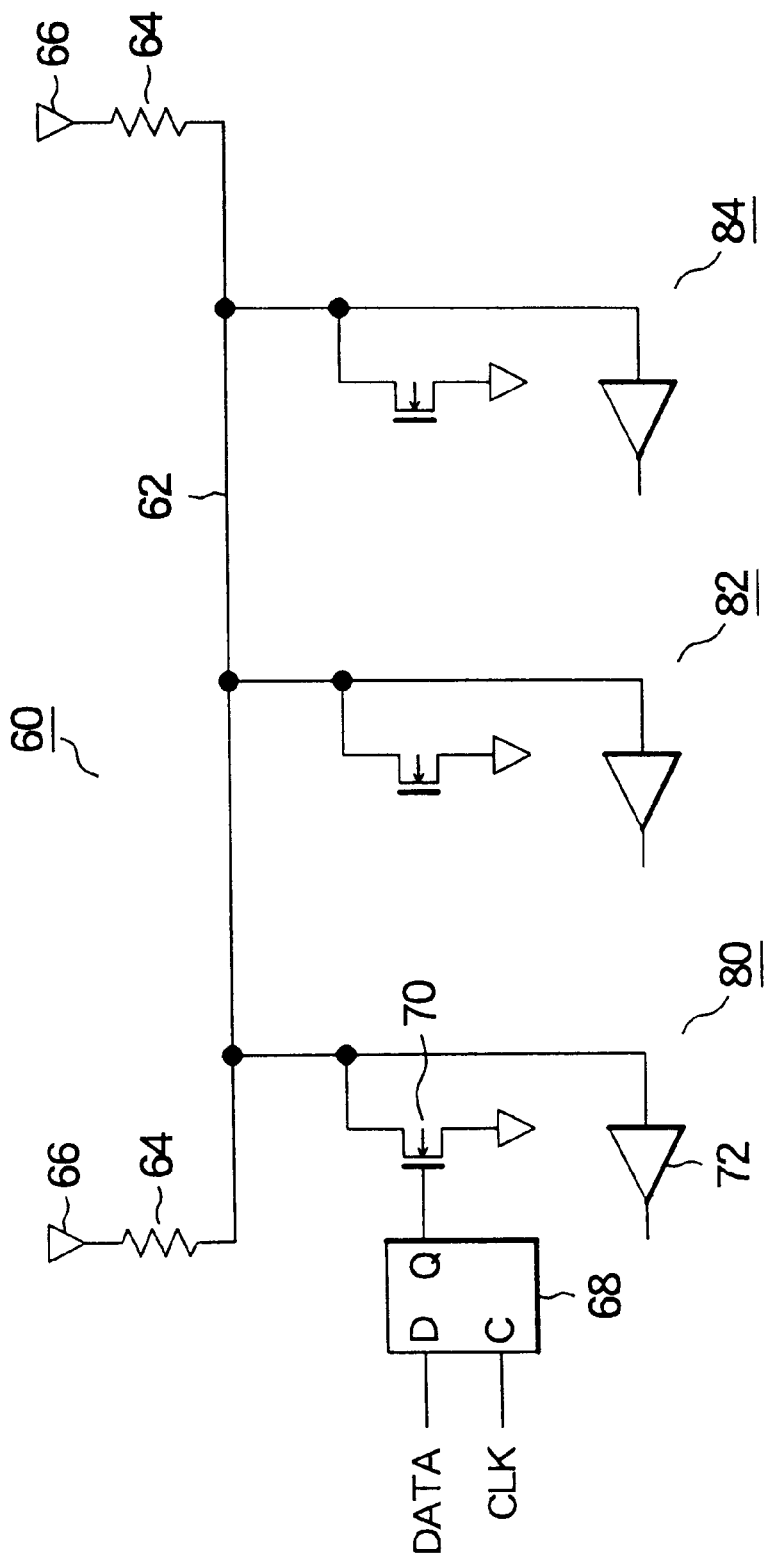
FIG. 1 shows a conventional data transmission circuit.

Referring to FIG. 1, a conventional data transmission circuit will be described at first in order to facilitate an understanding of this invention. The illustrated data transmission circuit 60 uses a low-amplitude level.

The data transmission circuit 60 has bidirectional buffer circuits 80, 82, and 84 interconnected over a transmission line 62. Moreover, both terminals of the transmission line 62 are connected to a terminating voltage 66 via terminating resistors 64.

Each of the bidirectional buffer circuits 80, 82, and 84 has an n-channel open-drain buffer 70 and input buffer circuit 72. An output signal of a latch circuit 68 is supplied to the gate of the n-channel open-drain buffer 70. When the output signal of the latch circuit 68 goes high, the transmission line 62 is grounded by the n-channel open-drain buffer 70. Consequently, a low-level signal is transmitted over the transmission line 62. Each of the bidirectional buffer circuits 80, 82, and 84 has the latch circuit 68. For the sake of convenience, the latch circuit is illustrated in only the bidirectional buffer circuit 80 in FIG. 1. Data transmitted over the transmission line 62 is supplied to internal circuits through the input buffer circuits 72 included in the bidirectional buffer circuits 80, 82, and 84 respectively.

As described above, the data transmission circuit 60 shown in FIG. 1 adopts the n-channel open-drain buffer 70. A high-level output voltage is set with the terminating voltage 66, and a low-level output voltage is set with the driving abilities of the terminating resistors 64 and n-channel open-drain buffer 70. A low-amplitude level can therefore be produced easily. Moreover, when the n-channel open-drain buffer 70 is off, that is, when a signal on the transmission line 62 has a high level, the input terminal of each bidirectional buffer circuit exhibits a high-impedance (Hz) level. Unlike a type of data transmission circuit adopting p-channel and n-channel transistors as output transistors, it is unnecessary to set an output terminal to a high impedance in advance for the purpose of data reception. From this viewpoint, the data transmission circuit 60 has the advantage of being user-friendly.

Reflection of data occurs at terminals of a transmission line in the conventional data transmission circuit, as will be described later. It is therefore essential to absorb the reflection fully. When an output level changes from a high level to low level in the conventional data transmission circuit, the n-channel open-drain buffer 70 drives the transmission line 62 to the low level. A reflected wave can be somewhat absorbed due to an output impedance offered by the transistor.

However, when the output level changes from the low level to the high level, the n-channel open-drain buffer 70 is turned off to offer the output impedance Hz. The reflected wave cannot be absorbed fully. This causes a distortion in an output waveform. At this time, if reflection could be absorbed fully by the terminating resistors 64 coupled to the transmission line 62, no problem would occur. However, it is in practice very difficult to fully absorb reflection using terminating resistors alone.

In the past, therefore, a time instant at which an output level changes from a low level to a high level has been delayed on purpose in an effort to minimize reflection. An output waveform may be trimmed with respect to a slew rate in order to absorb a reflected wave. This method cannot help inviting a decrease in a data transmission rate.

Figure 2:
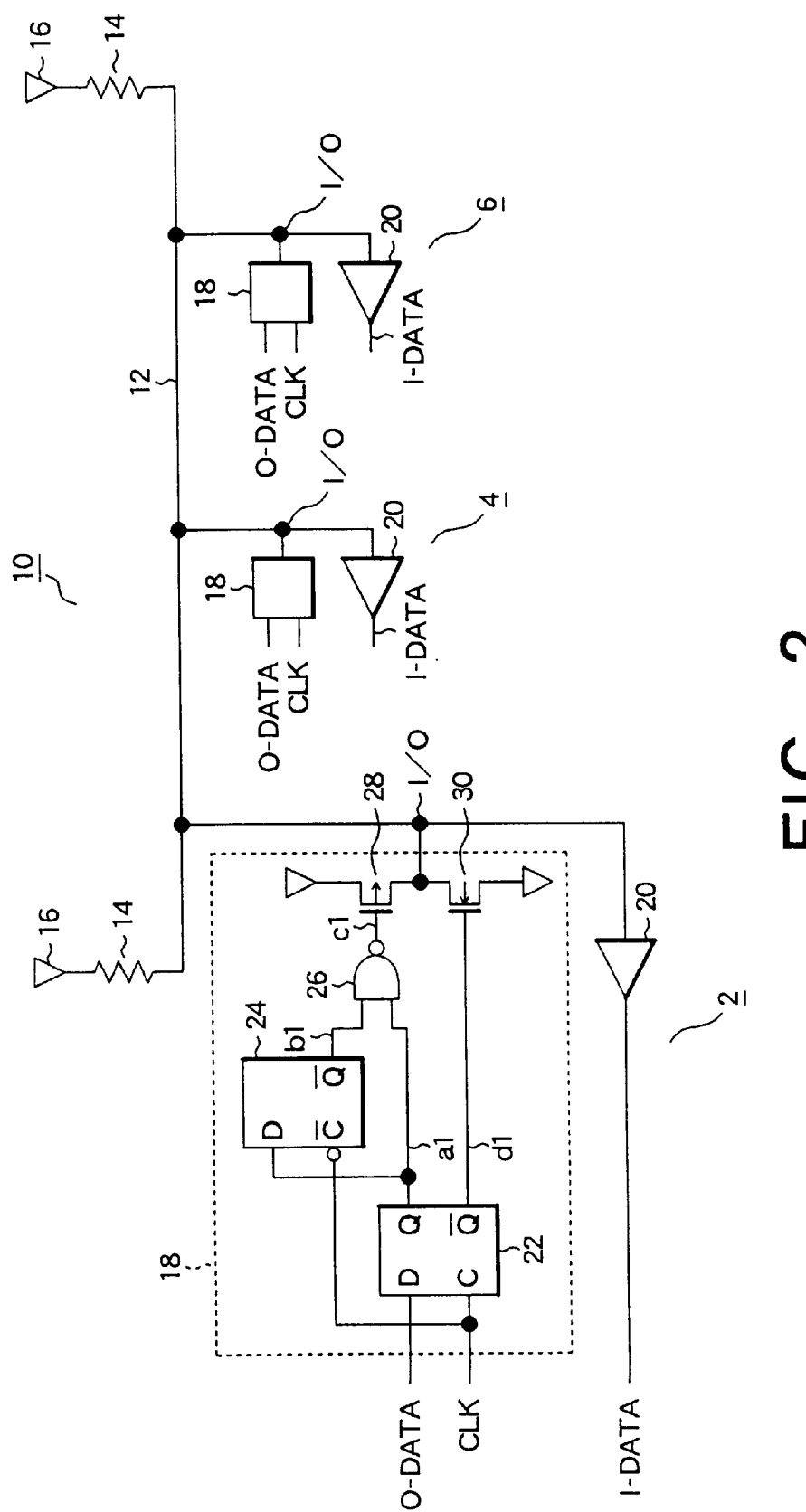
FIG. 2 shows a data transmission circuit having an output buffer circuit according to a first embodiment of the this invention.

Referring to FIG. 2, description will proceed to a synchronous buffer circuit and a data transmission circuit using the synchronous buffer circuit according to a preferred embodiment of this invention. The data transmission circuit 10 comprises a transmission line 12, synchronous bidirectional buffer circuits 2, 4, and 6, terminating resistors 14, and a terminating voltage 16. The synchronous bidirectional buffer circuits 2, 4, and 6 are interconnected over the transmission line. The terminating resistors 14 and terminating voltage 16 are connected to both terminals of the transmission line 12. In this embodiment, three synchronous bidirectional buffer circuits are interconnected over the transmission line 12. A data transmission circuit in accordance with the this invention is not limited to the configuration having three synchronous bidirectional buffer circuits. The number of interconnected synchronous bidirectional buffer circuits is not limited to any value.

The transmission line 12 included in the data transmission circuit 10 is inscribed on a printed-circuit board. Input/output terminals of semiconductor devices mounted on the printed-circuit board are interconnected over the data transmission line 12. In other words, the synchronous bidirectional buffer circuits 2, 4, and 6 are input/output buffer circuits included in different semiconductor devices. The synchronous bidirectional buffer circuits 2, 4, and 6 are integrated together with internal circuits of the semiconductor devices into semiconductor chips. The synchronous bidirectional buffer circuits 2, 4, and 6 are interconnected over the transmission line 12 on the printed-circuit board.

The semiconductor chips having the synchronous bidirectional buffer circuits 2, 4, and 6 are not limited to any particular types. For example, the synchronous bidirectional buffer circuit 2 may be an input/output buffer included in a semiconductor memory device such as a DRAM. The synchronous bidirectional buffer circuit 4 may be an input/output buffer included in a signal processing device such as a microprocessor. The synchronous bidirectional buffer circuit 6 may be an input/output buffer included in an image processing device such as a graphic controller.

The synchronous bidirectional buffer circuits 2, 4, and 6 each have an input/output node I/O, and are each electrically coupled to the transmission line 12 via the input/output node I/O. Moreover, the synchronous bidirectional buffer circuits 2, 4, and 6 each include an output buffer circuit 18 and an input buffer circuit 20. The output terminal of the output buffer circuit 18 and the input terminal of the input buffer circuit 20 are connected to the input/output node I/O.

The output buffer circuit 18 is, as shown in FIG. 2, composed of two latch circuits 22 and 24, a NAND gate 26, a p-channel MOS transistor 28, and an n-channel MOS transistor 30. The output buffer circuit 18 outputs output data O-DATA to the input/output node I/O synchronously with a clock signal CLK. The output buffer circuits 18 included in the synchronous bidirectional buffer circuits 4 and 6 have the same configuration as that included in the synchronous bidirectional buffer circuit 2. The output buffer circuits 18 included in the synchronous bidirectional buffer circuits 4 and 6 are not shown for brevity Vs sake. The source voltage of the p-channel MOS transistor 28 shall be substantially identical to the terminating voltage 16. The source voltage of the n-channel MOS transistor 30 is therefore substantially different from the terminating voltage 16.

The input buffer circuit 20 supplies a signal developing at the input/output node I/O as data I-DATA to the internal circuits. According to this invention, the input buffer circuit 20 is not limited to any exemplary configuration.

Next, the actions of the data transmission circuit 10 in accordance with this embodiment will be described centered on the actions of each output buffer circuit 18 with reference to FIGS. 2 and 3 alike. As shown in FIG. 2, the clock signal CLK and output data O-DATA are supplied in common to the latch circuits 22 and 24. The latch circuit 22 receives the output data O-DATA in response to the leading edge of the clock signal CLK. By contrast, the latch circuit 24 receives the output data O-DATA in response to the trailing edge of the clock signal CLK. Data developing at the input/output node I/O exhibits a level listed in FIG. 3.

Figure 3:
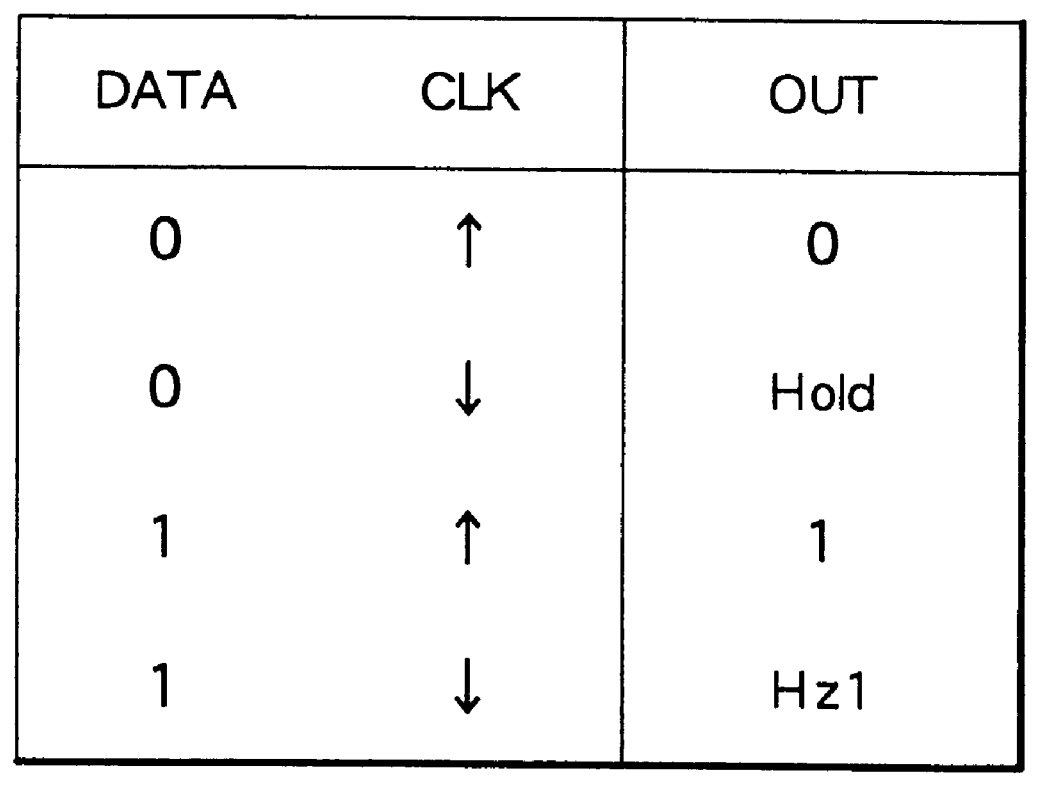

FIG. 3 lists levels to be exhibited by the signal developing at the input/output node I/O depending on whether the clock signal CLK rises or falls and whether the output data O-DATA is low (0) or high (1). Four states shown in FIG. 3 will be described. First, when the clock signal CLK rises and the output data O-DATA is low (0), the latch circuit 22 latches the low level (0). A signal d1 is therefore high (1). This causes the n-channel MOS transistor 30 to conduct. At this time, a signal al is low (0). An output signal of the NAND gate 26 is high (1), and the p-channel MOS transistor 28 is nonconducting. The input/output node I/O is therefore driven low (0).

When the output data O-DATA remains low (0) and the clock signal CLK falls, the latch 24 latches the low level (0), and a signal b1 goes high (1). However, since the signal al is low (0), an output signal cl of the NAND gate 26 remains high (1). The input/output node I/O is therefore driven low (0). The data at the input/output node I/O therefore does not change at all (Hold).

Thereafter, the output data O-DATA may go high (1) at the leading edge of the clock signal CLK. In this case, the latch circuit 22 latches the high level (1). The signal d1 is therefore driven low (0). This causes the n-channel MOS transistor 30 to become nonconducting. At this time, the signal a1 is high (1) and the signal b1 is high (1). The output signal of the NAND gate 26 is therefore driven low (0). This causes the p-channel MOS transistor 28 to conduct. Consequently, the input/output node I/O is driven high (1).

When the output data O-DATA remains high (1) and the clock CLK rises, the latch circuit 24 latches the high level (1). The signal b1 goes low (0). The output signal c1 of the NAND gate 26 is therefore driven high (1). This causes the p-channel MOS transistor 28 and n-channel MOS transistor 30 to become nonconducting. Consequently, the input/output node I/O comes to offer a high output impedance (Hz). The data at the input/output node I/O remains high (1) (Hz(1)).

Figure 4:
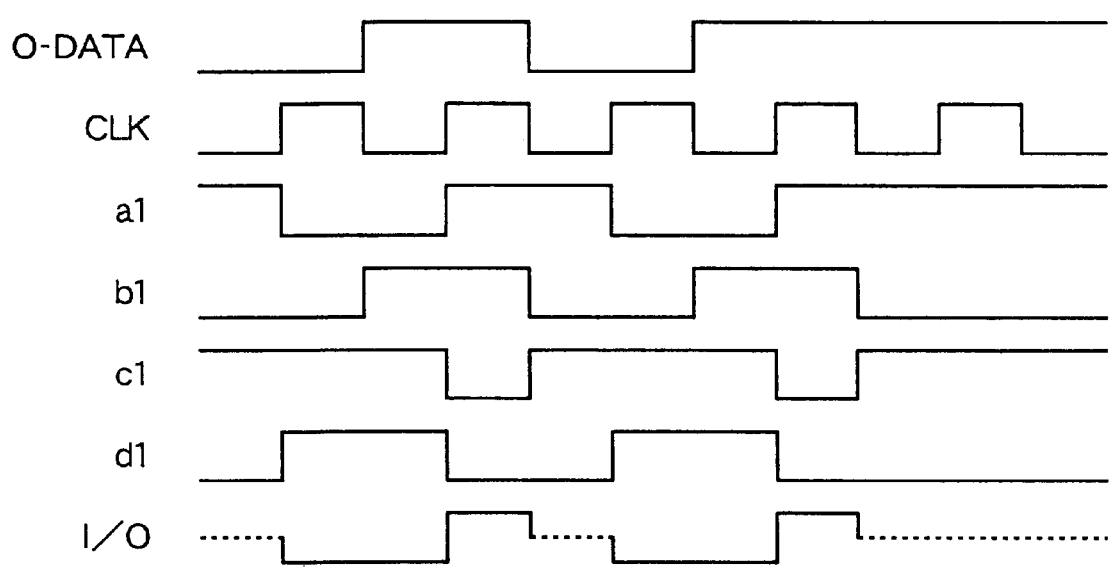
FIG. 4 is a timing chart for describing operation of the output buffer circuit illustrated in FIG. 2.

FIG. 4 is a timing chart indicating the foregoing four states. As apparent from FIG. 4, a change in the output data O-DATA is transmitted to the input/output node I/O in response to the leading edge of the clock signal CLK. It does not take place that the output data O-DATA is driven low (0) during a period during which the input/output node I/O should be driven low (0). It also does not take place that the output data O-DATA is driven high (1) during a period during which the input/output node I/O should be driven high (1). The output data O-DATA is driven high (1) during only a half of the cycle of the clock signal CLK. Thereafter, the output data O-DATA is not driven at all by the output buffer circuit 18. Incidentally, the dot lines in FIG. 4 indicate that a high output impedance is offered, or in other words, that both the p-channel MOS transistor 28 and n-channel MOS transistor 30 are nonconducting.

Specifically, when the latch circuit 22 latches the low level (0), the n-channel MOS transistor 30 is turned on and the transmission line 12 is driven low. When the latch circuit 22 latches the high level (1), the p-channel MOS transistor 28 is turned on during only a period during which the latch circuit 22 latches the low level (0). The transmission line 12 is driven high during the period.

When a signal on the transmission line 12 is low (0), reflection of the signal is absorbed owing to an output impedance offered by the n-channel MOS transistor 30. When the signal is high (1), reflection of the signal is absorbed owing to an output impedance offered by the p-channel MOS transistor 28 during a period during which reflection occurs. The period during which reflection occurs corresponds to an initial stage of a change in the signal. The influence of reflection can therefore be minimized effectively.

Moreover, after reflection is absorbed, that is, after data on the transmission line 12 changes from the low level (0) to the high level (1), a half cycle of the clock signal CLK elapses. At this time, the output buffer circuit 18 offers a high output impedance. A high potential on the transmission line 12 is determined with the resistance of the terminating resistors 14 and the terminating voltage 16. A low amplitude useful for fast processing can therefore be ensured. Since the output buffer circuit 18 offers a high output impedance, the input buffer circuit 20 can swing into an input action.

As mentioned above, the data transmission circuit 10 of this embodiment adopts the output buffer circuit 18. Consequently, fast transmission can be realized based on a low amplitude with the influence of reflection minimized.

Figure 5:
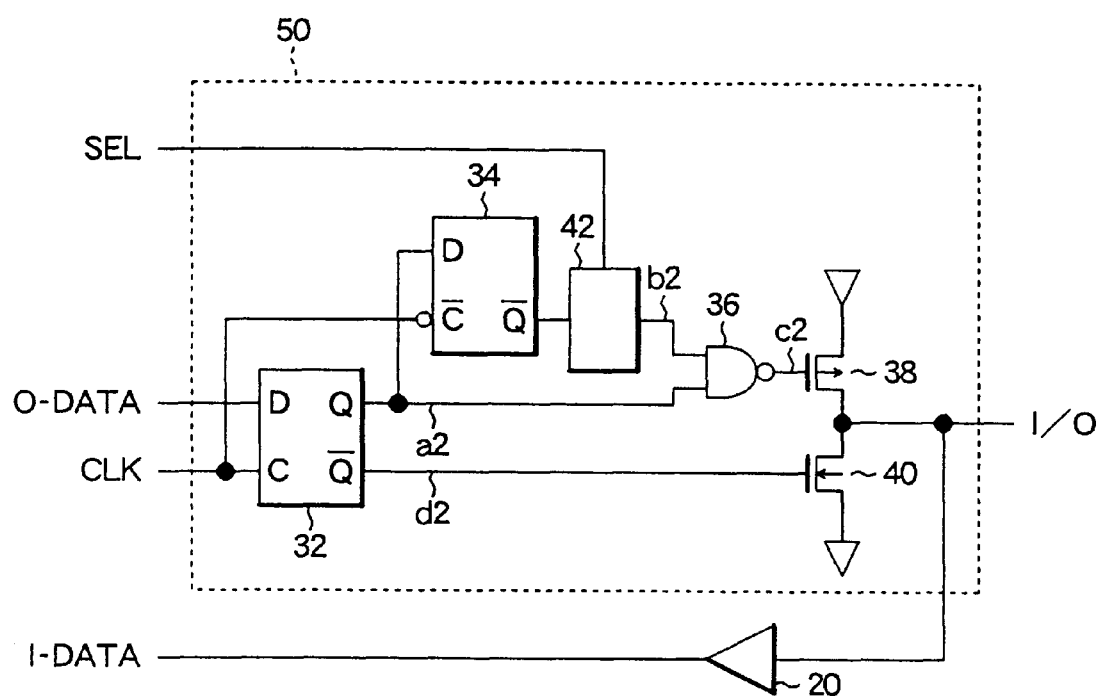
FIG. 5 shows an output buffer circuit according to a second embodiment of this invention.

The output buffer circuit 18 adopted by the data transmission circuit 10 may be replaced with an output buffer circuit 50 shown in FIG. 5. As shown in FIG. 5, the fundamental configuration of the output buffer circuit 50 is identical to that of the output buffer circuit 18 shown in FIG. 2. A difference from the output buffer circuit 18 lies in a point that a delay circuit 42 is inserted between the output terminal of the latch circuit 34 and the input terminal of the NAND gate 36. Specifically, in the output buffer circuit 50, the delay circuit 42 delays an output of the latch circuit 34 and transfers it to the NAND gate 36.

Figure 6:
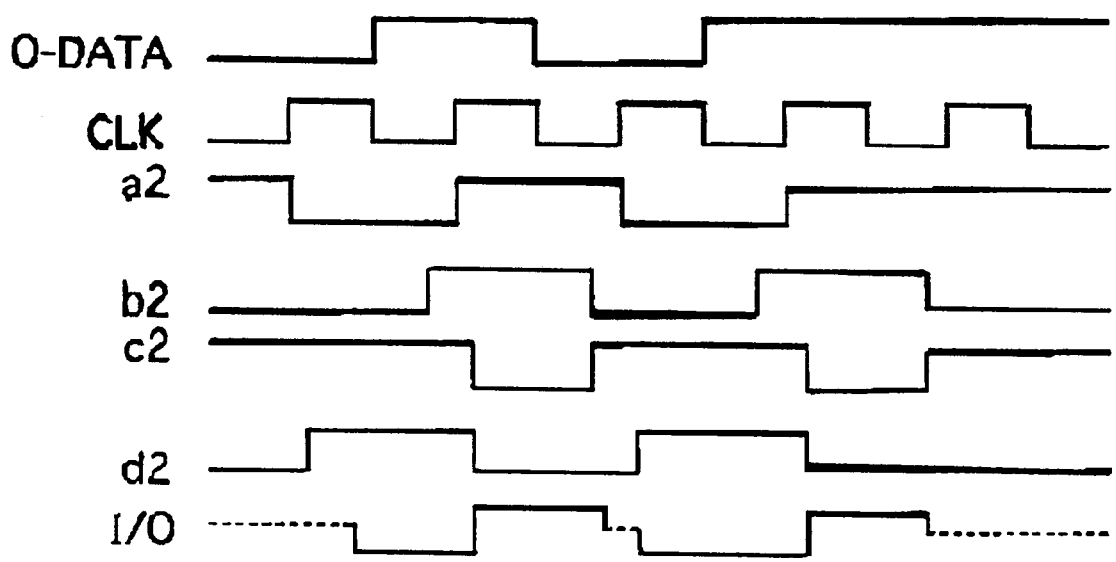
FIG. 6 is a timing chart for describing operation of the output buffer circuit illustrated in FIG. 5.

A period is thus extended during which the p-channel MOS transistor 38 is conducting. Consequently, the input/output node I/O remains high (1) for a longer period than that in the output buffer circuit 18. This situation is shown in the timing chart of FIG. 6. The dot lines in FIG. 6 indicate a state in which a high output impedance is offered, that is, both the p-channel MOS transistor 38 and n-channel MOS transistor 40 are nonconducting.

Reflection occurs when data on the transmission line 12 changes from the low level (0) to the high level (1). The reflection may not be fully absorbed by merely driving a p-channel MOS transistor included in an output buffer circuit over a period corresponding to a half cycle of the clock signal CLK. Incidentally, the p-channel MOS transistor 28 in the output buffer circuit 18 is driven over the half-cycle period in order to absorb the reflection.

In the output buffer circuit 50, however, the p-channel MOS transistor 38 is driven over a period corresponding to the sum of the half cycle of the clock signal CLK and the delay time produced by the delay circuit 42. The reflection can therefore be absorbed fully.

A control signal SEL to be input to the delay circuit 42 is used to adjust the magnitude of a delay produced by the delay circuit 42. The use of the control signal SEL can optimize a driving time for the p-channel MOS transistor 38. During the driving time, the p-channel MOS transistor 38 should be driven in order to change the input/output node I/O from the low level (0) to the high level (1). However, when an optimal driving time is apparent in advance, it is unnecessary to employ the delay circuit 42 capable of producing a delay whose magnitude is variable. A delay circuit for producing a delay of a single magnitude will do. In this case, the control signal SEL is, needless to say, unnecessary.

As described so far, according to the this invention, a means is included for driving a transmission line to a high level (1). When data on the transmission line changes from a low level (0) to the high level (1), the means drives the transmission line to the high level (1) over a predetermined period alone. Consequently, fast transmission can be realized based on a low amplitude with the influence of reflection minimized.

While this invention has thus far been described in conjunction with the preferred embodiment thereof, it will readily be possible for those skilled in the art to put this invention into practice in various other manners.

What is claimed is:

1. A synchronous buffer circuit for outputting a buffered signal as an output signal to an output terminal in synchronous with a clock signal, said clock signal having first and second edges, said first edge being one of leading and trailing edge, said second edge being another one of said leading and said trailing edge, comprising:

a latch circuit for latching said buffered signal as a latched signal in response to said first edge; and producing means for producing a first one of high and low levels as said output signal until a next first edge is supplied, when said latched signal has a first logic level, said producing means producing a second one of said high and said low levels until a next second edge is supplied, when said latched signal has a second logic level, wherein said producing means making said output terminal be a high impedance until said first edge is supplied after producing said second level.

2. A data transmission circuit comprising a transmission path and a plurality of synchronous buffer circuits, a terminating voltage being applied to said transmission path through a terminating resistor, each or said synchronous buffer circuits being electrically coupled to said transmission path at a output terminal, wherein each of said synchronous buffer circuits comprising:

a latch circuit for latching a buffered signal as a latched signal in response to said first edge; and producing means for supplying said output terminal with a first one of high and low levels until a next first edge is supplied, when said latched signal has a first logic level, said producing means supplying said output terminal with a second one of said high and low levels until a next second edge is supplied, when said latched signal has a second logic level;

wherein said producing means making said output terminal be a high impedance until said first edge is supplied after producing said second level.

3. A synchronous buffer circuit for outputting a buffered signal as an output signal to an output terminal in synchronous with a clock signal, said clock signal having first and second edges, said first edge being one of leading and trailing edge, said second edge being another one of said leading and said trailing edge, comprising:

first means for producing one of high and low levels as said output signal in a predetermined period in accordance with a first status of which a data line is a first logic level; and second means for producing another one of said high and said low levels as said output signal in accordance with a second status of which said data line is a second logic level;

wherein said first means makes said output terminal being a high impedance after said predetermined finishes until said second means produces said output signal.

4. The synchronous buffer circuit of claim 3 further comprising third means for changing said predetermined period in order to absorb a reflection wave.

5. A data transmission circuit comprising a transmission path and a plurality of synchronous buffer circuits, a terminating voltage being applied to said transmission path through a terminating resistor, each or said synchronous buffer circuits being electrically coupled to said transmission path, wherein each of said synchronous buffer circuits comprising:

first means for making said transmission path being one of a first voltage substantially equal to said terminating voltage and a high impedance;

second means for supplying said transmission path with a second voltage substantially different from said terminating voltage; and third means for controlling, in synchronous with a clock signal, said first means to make said first means supplying said transmission path with said first voltage over a part of a predetermined period, when an own synchronous buffer circuit transfers one of first and second logic levels to another synchronous buffer circuit in said predetermined period, said third means controlling, in synchronous with said clock signal, said second means supplying said transmission path with said second voltage over said predetermined period, when said own synchronous buffer circuit transfers another one of said first and said second logic levels to another synchronous buffer circuit in said predetermined period; transmission path being a high impedance during other part of said predetermined period after supplying said transmission path with said first voltage.

6. The data transmission circuit of claim 5 further comprising forth means for changing said first part of said predetermined period in order to absorb a reflection wave produced in said transmission path.

* * * * *

UNITED STATES PATENT AND TRADEMARK OFFICE
CERTIFICATE OF CORRECTION

PATENT NO. : 6,172,539 B1  Page 1 of 1
DATED : January 9, 2001
INVENTOR(S) : Mitsuaki Tagishi It is certified that error appears in the above-identified patent and that said Letters Patent is hereby corrected as shown below:

<u>Column 8,</u>
Line 2, after "predetermined" insert -- period --.

Signed and Sealed this

Fourteenth Day of May, 2002

Attest:

JAMES E. ROGAN
*Attesting Officer*  *Director of the United States Patent and Trademark Office*